Oct. 24, 1972  H. P. DAVIS  3,700,542
SAFETY WINDSHIELD AND METHOD OF MAKING SAME
Filed May 3, 1971
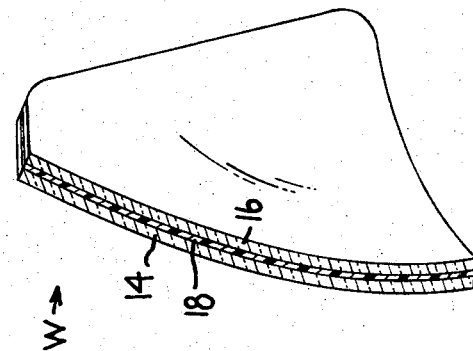
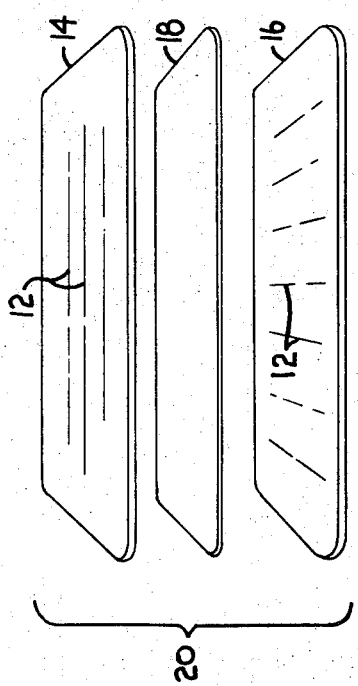
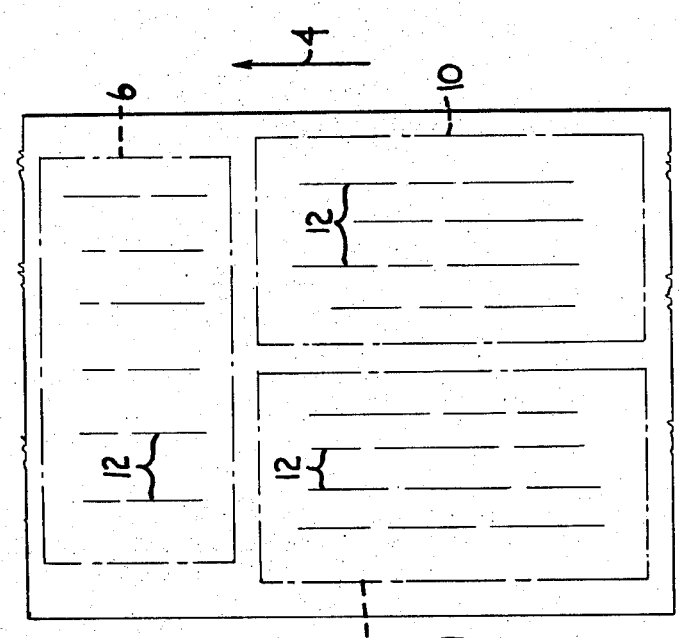
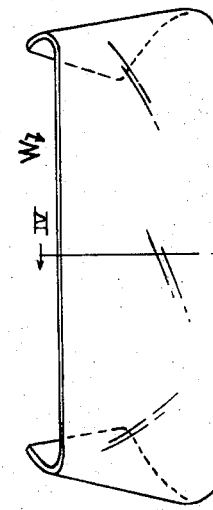
INVENTOR
HARRY P. DAVIS
BY Chisholm and Spencer
ATTORNEYS

United States Patent Office 3,700,542
Patented Oct. 24, 1972

3,700,542
SAFETY WINDSHIELD AND METHOD
OF MAKING SAME
Harry P. Davis, Tarentum, Pa., assignor to
PPG Industries, Inc., Pittsburgh, Pa.
Filed May 3, 1971, Ser. No. 139,412
Int. Cl. B32b 17/10
U.S. Cl. 161—125          16 Claims

ABSTRACT OF THE DISCLOSURE

In making safety windshields from float or sheet glass, at least one of the sheets is made from glass cut WSW. Preferably, a blank cut WLW is paired with a blank cut WSW, the usual plastic interlayer being provided. This technique improves quality or yield and is of particular usefulness in making windshields from extra-thin float or sheet glass. Windshields made in this manner have distortion lines in one glass sheet oriented at an angle with respect to distortion lines in a second glass sheet.

CROSS REFERENCE TO OTHER APPLICATIONS

This application is a continuation-in-part of application Ser. No. 88,580 of Harry P. Davis, filed Nov. 12, 1970, for Safety Windshield and Method of Making Same.

BACKGROUND OF THE INVENTION (1) Field of the invention

This invention relates to safety windshields and to a method of making the same from glass that is neither ground nor polished.

(2) Description of the prior art

It is, of course, old to make safety windshields by laminating a first ply of flat glass, a plastic interlayer, and a second ply of flat glass. Before about 1960, the plies of flat glass used in this process were almost invariably of ground and polished plate glass, which inherently has excellent freedom from distortion. More recently, it has been customary to use float glass about ⅛-inch thick for the first and second plies of flat glass. The float glass is produced by a process such as that described in U.S. Pat. No. 3,083,551. Such float glass makes eminently satisfactory windshields, but since its optical quality as determined by freedom from distortion is somewhat poorer than that of ground and polished plate glass, windshields made therefrom must sometimes be rejected, especially if the design for the intended product calls for having one of the plies of glass to be thinner than usual (about 3 millimeters) or if the design is for a windshield that is to be installed in an automobile at a relatively low angle with respect to the horizontal, such as 35° or less. The installation angle is measured at the intersection of an oblique plane tangent to the transverse axis at the longitudinal center of the installed windshield with a horizontal plane. In some automobiles manufactured in the United States, this angle is as low as 31°. Lesser angles of installation are contemplated for future automotive styling.

Sheet glass is also acceptable for use in laminated windshields, particularly those using sheet glass marketed under the trade names of Pennvernon and Vertiglas. However, sheet glass, like float glass, has its limitations as to optical properties, particularly when used in a windshield installed at a small angle to the horizontal.

Two trends are operating that tend to make is difficult to supply satisfactory safety windshields made from glass that is not ground or polished. One is the trend, for styling reasons, toward the use of the lower installation angles mentioned above, i.e., 35° and lower. As the installation angle becomes lower, it becomes more difficult for a windshield to hide its lines of distortion. Hence, at small installation angles, it may fail to meet commercial standards. The other is the consideration that for safety purposes, it is considered desirable to produce a windshield having one or both glass plies of reduced thickness, such as 2.5 millimeters or less.

In the float glass process and in the sheet glass process as well, the glass is attenuated in the direction in which it is drawn. Such attenuation tends to cause optical distortion. Since thinner float glass or sheet glass must be attenuated more greatly than thicker glass, it tends to exhibit more distortion. The distortion associated with attenuation includes a series of semicylindrical lenses at each surface of the drawn glass ribbon relative to the center plane of the ribbon that are parallel to one another and alternate between convex and concave semi-cylindrical lenses. In the case of float glass, the curvatures at the surfaces are usually in the opposite sense to one another at any localized area of the ribbon. In the case of sheet glass, when one surface provides a convex semi-cylindrical lens in a localized area, the opposite surface at the localized area is usually also convex, and when one surface of a localized area of a sheet glass ribbon is concave, the opposite surface of the localized area is usually also concave.

There are two different ways of cutting windshield blanks from a ribbon of plate or float or sheet glass, namely, "WLW" and "WSW". A windshield blank is generally oblong. In WLW, the length of the oblong corresponds with the length of the ribbon; in WSW, the length of the oblong is transverse to the length of the ribbon. Before the present invention, commercial laminated windshields comprised a pair of glass plies that have both been cut the same way, WLW or WSW. This has been true chiefly because it makes the manufacturing operation somewhat more convenient and less complex. However, laminated windshields having both of the glass sheets cut WSW have been unsuitable for commerce because they had a defect known as "cross car distortion," a factor that discouraged those skilled in the art from incorporating a sheet cut WSW in a laminated windshield unless the glass quality was exceptional so that the distortion or draw lines were practically invisible.

SUMMARY OF THE INVENTION

In making safety windshields from two blanks of unground and unpolished glass with the usual plastic interlayer, one glass blank cut WSW is provided in combination with a glass blank cut WLW. This technique improves quality or yield, and it is of particular usefulness in making windshields from extra-thin float glass and/or sheet glass. A float glass or sheet glass blank cut WSW is paired with a float glass or sheet glass blank cut WLW. Both glass blanks may be of float glass, both may be of sheet glass and the windshield may comprise a combination of one float glass blank with one sheet glass blank.

This invention is limited to laminated windshields in which the glass plies are made of glass other than plate glass. Plate glass is ground and polished to remove surface irregularities. Grinding and polishing are expensive operations that can be eliminated in the manufacture of sheet glass or float glass. The present invention avoids the need for expensive plate glass in windshields of good optical quality.

DESCRIPTION OF THE DRAWINGS

A complete understanding of the present invention may be obtained from the foregoing and following description thereof, taken together with the appended drawings, in which:

FIG. 1 is a schematic representation of a ribbon of float glass or sheet glass, indicating how certain windshield blanks may be cut therefrom.

FIG. 2 is an exploded view of the plies used in the making of a safety windshield in accordance with the present invention;

FIG. 3 is a perspective view of a bent laminated windshield fabricated from the plies depicted in FIG. 2; and FIG. 4 is a sectional view taken along the lines IV—IV of FIG. 2.

DESCRIPTION OF THE PREFERRED EMBODIMENTS

Referring to FIG. 1, there is indicated a floatglass or sheet glass ribbon 2, the length of which extends parallel to the arrow 4. There is indicated at 6 a windshield blank cut WSW from the ribbon 2. Blanks 8 and 10 are cut from the ribbon 2 WLW. On the blanks 6, 8, and 10 there are indicated lines 12 that correspond to lines of distortion, usually barely visible, that are almost invariably present in float glass or sheet glass.

The float glass or sheet glass ribbon 2 has a thickness such as about 1.5 to 3 millimeters. Usually the lines 12 are more distinct and troublesome if the glass is thinner. The invention is of particular usefulness with float glass or sheet glass 1.5 to 2.2 millimeters thick, and especially when such glass is to be used for the manufacture of an automotive windshield having an installation angle of about 35° from the horizontal or less.

The cutting of the blanks from the float glass or sheet glass ribbon may be accomplished conveniently and effectively in accordance with practices, and with the use of equipment, already know per se. After the blanks are cut, it is customary to cut from the blanks pieces of suitable outline shape, using a pattern cutter. After the cutting of such shaped pieces and any desired or necessary edging, beveling or inspecting thereof, there are obtained plies 14 and 16 (seen in FIG. 2) that may be made, for example, from the blanks 8 and 6, respectively. There is also produced, in known manner, a plastic interlayer piece 18 of suitable shape, and as indicated by the brackets 20, these are to be assembled by the customary laminating procedure to produce a windshield. Heating and bending steps are performed in a conventional manner.

To produce bent, laminating windshields, a pair of glass sheets of slightly different outline and different orientation of distortion lines (one of float glass or sheet glass and the other of float glass or sheet glass) are mounted on each of a series of bending molds of concave elevation with a suitable parting material between the glass sheets. A preferred parting material is diatomaceous earth and its method of application is described in U.S. Pat. No. 2,725,320 to Florian V. Atheson and James S. Golightly. The glass-laden molds are conveyed through an elongated tunnel where the glass is heated to bending temperature to sag the sheets to the concave elevational shape of the mold. The bent sheets are cooled at a controlled rate until the glass sheets are cool enough for handling.

Typical apparatus for bending a pair of glass sheets of slightly different outline is disclosed in U.S. Pats. No. 3,248,196 to Harold E. McKelvey and No. 2,924,485 to Ewell C. Miles, both assigned to PPG Industries, Inc. An alternative technique involving press bending individual glass sheets to their desired shape and then laminating the press bent sheets is disclosed in British Pat. No. 1,202,187 to John Comperatore.

The bent glass sheets are then ready for lamination. When laminated to a plasticized polyvinyl butyral interlayer, a sandwich is assembled having one of the bent sheets of a bent pair having its distortion lines extending generally in a first direction disposed on one side of the interlayer to form a concave outer surface of the sandwich to face the interior of a vehicle and the other bent glass sheets of the bent pair having its distortion lines extending approximately normal to said first direction disposed on the other side of the interlayer to form a convex outer surface of the sandwich to face the exterior of the vehicle.

The laminating is conducted in two stages. The first stage, viz., prepressing, is performed using rubber tubing edge channels as described in U.S. Pat. 2,948,645 to Laurence A. Keim. The matching pairs of bent glass sheets are assembled with the interlayer therebetween to form sandwich structures. The tubing is then fitted around the edge periphery of each sandwich and connected to a vacuum source. The prepressing is performed at a temperature of 300 degrees Fahrenheit for 13 minutes using a vacuum of 26–29 inches of mercury.

The prepressed windshield samples are then autoclaved in an oil autoclave for 45 minutes at 275 degrees Fahrenheit using 200 pounds per square inch autoclaving pressure. Following the autoclaving, the laminated windshields are allowed to cool to room temperature.

Some obvious variations may be made in the interlayer material, for example, various treatments of plasticized polyvinyl butyral, such as those suggested in any of the following patents: U.S. Pats. Nos. 3,178,334; 3,202,568; 3,231,461; 3,249,487; 3,249,488; 3,249,489; 3,249,490; 3,262,835; 3,262,837; 3,271,233; 3,271,234; 3,271,235; 3,361,699; 3,372,074; 3,384,532; 3,396,074; 3,402,099; 3,424,646; 3,434,915; 3,437,552; 3,437,553; 3,455,754; or 3,468,749. Other variations may involve the use of polyurethanes as the interlayer. For example, suitable polyurethane interlayers and glass laminates containing polyurethane interlayers are disclosed in U.S. Pats. Nos. 3,388,101 and 3,445,423 and in Canadian Pats. Nos. 673,674; 673,678; 813,857; and 817,392. Still another variation involves reducing the adhesion of either or both glass sheets to the interlayer by the technique suggested in U.S. Pat. No. 3,505,160 to George E. Michaels and Raymond G. Ricser.

Other variations contemplated within the purview of the present invention may reside in the manner of lamination. Preliminary pressing may be accomplished using roll pressing apparatus of the type depicted in U.S. Pats. Nos. 2,983,635 to Ronald E. Richardson or 3,351,001 to Anthony A. Achkio, for example, instead of the vacuum evacuation ring technique of the Keim patent described in the illustrative embodiment. In addition, final lamination may be accomplished in an air autoclave rather than the oil autoclave technique described above.

It is not to be taken from the foregoing that in the manufacture of a commercial windshield, the plies 14 and 16 are necessarily to be taken from the same ribbon of float glass or sheet glass, or are to be of the same thickness. It is quite possible, and indeed in most instances it will be desirable, to produce a windshield having an outer ply of thicker glass and an inner ply of thinner glass. What is important, in accordance with the invention, is that the pieces or plies that are assembled are such that the distortion lines 12 of one ply are oriented substantially normal with respect to the distortion lines 12 of the other ply forming the windshield when it is assembled. It is conceivable that this criterion can be met by cutting blanks from a float-glass ribbon in a manner that is neither WLW or WSW, but rather angularly. Such a cutting method is difficult to implement and is wasteful of glass, but in principle, the present invention is not strictly limited to the making of windshields from float glass or sheet glass wherein one of the blanks is cut WSW and the other WLW. All that is required is that the distortion lines that parallel the length of the ribbon from which the blanks are cut be, as indicated above, normal to each other, or substantially so, in the assembled laminated windshield. In this regard, a minor deviation from absolute perpendicularity is surely tolerable; indeed, the improved results of the instant invention are obtained so long as the lines 12 are within about 20° of perpendicularity.

EXAMPLE I

In one example of the practice of the present invention, windshields were made by pairing plies cut WLW from float glass ribbons of 3/32-inch nominal thickness with plies cut WSW from float glass ribbon stock 1/8-inch thick, bending the pairs to the shape of the pattern desired and assembling and laminating the bent glass sheets to an interlayer of polyvinyl butyral 0.030-inch thick, using bending molds of the type depicted in the aforesaid U.S. Pat. No. 3,248,196 to bend the glass sheets, the apparatus of the aforesaid U.S. Pat. No. 3,351,001 for preliminary pressing and the final oil autoclave lamination technique as recited in the aforesaid U.S. Pat. No. 2,948,645. Windshields of satisfactory commercial quality for installation at an angle of about 35° were thus obtained. In contrast, when the same blanks from float glass ribbon stock 3/32-inch thick cut WLW were paired with plies cut WLW from 1/8-inch float glass ribbon stock, the resultant windshields were not of a quality high enough to meet commercial standards for the use indicated above.

EXAMPLE II

In another experiment, curved laminated windshields, each comprising two glass plies of 3/32-inch nominal thickness including a ply of float glass cut WSW from a float glass ribbon paired with a ply of sheet glass cut WLW from a sheet glass ribbon were bent as a pair, and prepressed and laminated as in Example I. The windshields produced from glass plies having their distortion lines so oriented passed an optical test to determine their commercial acceptance when installed at an installation angle of 31 degrees from the horizontal. Laminated windshields produced in a similar manner except that both plies were cut WLW failed the same optical test at the same installation angle.

EXAMPLE III

The following sets of glass-plastic laminates were prepared using either two plies of float glass or two plies of sheet glass or one ply of float glass and one ply of sheet glass laminated to opposite sides of an interlayer of plasticized polyvinyl butyral. The laminating operation was identical to those performed for the samples tested in Examples I and II. All the glass sheets had a nominal thickness of 3/32 inch while the interlayer was approximately .030 inch thick. Certain laminates tested had their draw lines of the glass sheets oriented parallel to one another while others had the draw lines of the respective glass sheets oriented perpendicular to one another.

The sample laminates were mounted in different oblique planes at different angles to the horizontal and inspected using the optical inspection test described below. The minimum acceptable angle of orientation at which each sample tested passed the optical inspection test is listed in the table below.

| Type of glass | Orientation | Average minimum acceptance angles, degrees |
|---|---|---|
| All float glass | Parallel (WLW) | 33.8 |
|  | Perpendicular | 23.0 |
| All sheet glass | Parallel (WLW) | 37.3 |
|  | Perpendicular | 26.2 |
| Float-sheet | Parallel (WLW) | 36.0 |
| Combination | Perpendicular | 29.5 |

It is obvious from the above results that a laminated glass-plastic assembly composed of glass sheets whose distortion lines are oriented normal to one another enables float glass or sheet glass of a given quality to be capable of meeting the optical requirements at sharper installation angles than laminated glass-plastic assemblies composed of glass sheets having their distortion lines extending parallel to one another.

OPTICAL INSPECTION TEST

The optical inspection test referred to hereinabove involved supporting a test windshield at a distance of 15 feet from an illuminated string board having vertically and horizontally extending white cords spaced one inch apart criss-crossing one another on a black background. Experienced test personnel viewed the cord pattern through each of the many windshields tested and determined from their past experience whether the windshields would be accepted or rejected by the customer.

The invention may be used to improve the quality of windshields made from float glass and/or sheet glass not good enough to provide adequate quality for commercial purposes when laminated with their distortion lines extending parallel or approximately parallel to one another. The invention can also be used to widen the range of applicability of curved laminated windshields by making it possible to retain adequate quality for commercial purposes for windshields installed at lower installation angles, starting with float glass and/or sheet glass having a given level of quality.

In a broader aspect, the invention is not strictly limited to the manufacture of windshields. The invention will find applicability in the production of other articles made of laminated pieces of float glass or sheet glass, where a high level of quality with respect to freedom from distortion is important. For example, the invention may be used in making doors or windows of laminated safety glass.

The form of the invention shown and described in this disclosure represents an illustrative embodiment thereof. It is understood that various changes may be made without departing from the spirit of the invention as defined in the claimed subject matter that follows.

I claim:

1. A laminated glass windshield comprising a first ply of glass, a second ply of glass, and a ply of resinous interlayer material therebetween, said first and second plies of glass having therein distortion lines, and the distortion lines in said first glass ply being oriented at a minimum angle of about 70 degrees with respect to the distortion lines in said second glass ply.

2. A laminated glass windshield as defined in claim 1, characterized in that said distortion lines in said first glass ply are oriented substantially normal with respect to the distortion lines in said second glass ply of said laminated windshield.

3. A windshield as defined in claim 2, wherein one of said plies of glass is composed of float glass.

4. A windshield as defined in claim 2, wherein at least one of said plies of glass is composed of sheet glass.

5. A windshield as defined in claim 2, characterized in that said first ply is made of float glass 1.5 to 2.2 millimeters thick.

6. A windshield as defined in claim 2, wherein said glass plies are curved.

7. A windshield as defined in claim 2, comprising an outer ply of float glass and an inner ply of sheet glass.

8. A windshield as defined in claim 7, wherein said glass plies are curved.

9. A windshield as defined in claim 2, comprising an outer ply of sheet glass and an inner ply of float glass.

10. A windshield as defined in claim 9, wherein said glass plies are curved.

11. A windshield as defined in claim 2, wherein both of said glass plies are sheet glass.

12. A windshield as defined in claim 11, wherein said glass plies are curved.

13. A windshield as defined in claim 2, wherein both of said glass plies are curved and of float glass.

14. In the method of making a laminated glass windshield comprising the step of laminating together a first ply of glass, a second ply of glass, and a ply of resinous interlayer material therebetween, said first and second plies of glass having therein distortion lines, the improvement comprising orienting the distortion lines in said first glass ply at a minimum angle of 70 degrees with respect to the distortion lines of said second glass ply, assembling said plies in the aforesaid orientation on opposite sides of said ply of interlayer material, and laminating said plies together while so assembled.

15. The improvement as in claim 14, wherein said glass plies are oriented with the distortion lines of said first glass ply oriented substantially perpendicularly to the distortion lines of said second glass ply.

16. The improvement as in claim 15, characterized in that said glass plies are bent to matching curvatures.

References Cited

UNITED STATES PATENTS

| | | | |
|---|---|---|---|
| 3,282,772 | 11/1966 | Davis, Sr. | 161—199 |
| 3,453,161 | 7/1969 | Golightly | 161—199 |
| 2,946,711 | 7/1960 | Bragaw, Jr. | 161—199 |

ROBERT F. BURNETT, Primary Examiner

D. J. FRITSCH, Assistant Examiner

U.S. Cl. X.R.

156—101, 102, 106; 161—165, 199